UNITED STATES PATENT OFFICE.

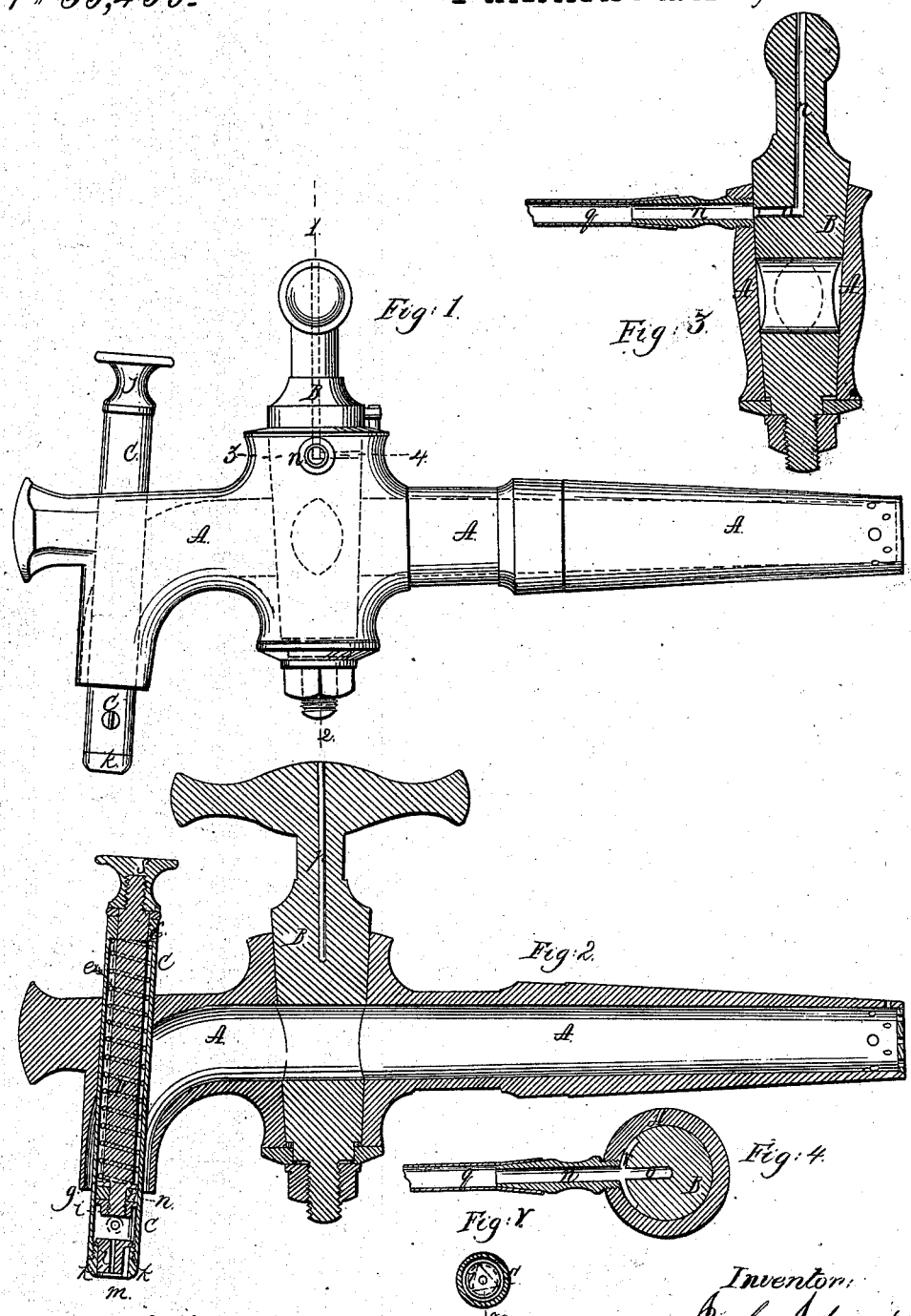

JACOB JAHRAUS AND JOHN GEORGE BICKEL, OF BUFFALO, NEW YORK.

IMPROVEMENT IN FAUCETS.

Specification forming part of Letters Patent No. 35,450, dated June 3, 1862.

*To all whom it may concern:*

Be it known that we, JACOB JAHRAUS and JOHN GEORGE BICKEL, of the city of Buffalo, county of Erie, and State of New York, have invented a new and Improved Beer-Faucet; and we do hereby declare that the following is a full, clear, and exact description thereof, reference being had to the accompanying drawings, and the letters of reference marked thereon, in which—

Figure I is a side elevation of my improved faucet. Fig. II is a longitudinal section of same. Fig. III is a cross-section of same on line 1 2. Fig. IV is a section on line 3 4. Fig. V is a plan of valve.

Letters of like name and kind refer to like parts in each of the figures.

A represents the faucet or cock with its nozzle opening downward.

B represents the key or plug fitted and operating in a common manner.

C represents the cylinder of a small force-pump or syringe, passing through the nozzle and projecting above and below. It is of less diameter than the nozzle, so as to leave an annular space around it through which the beer or liquor may issue when the key is properly turned.

D represents a piston or plunger placed within the cylinder and having a spring, $e$, coiled around it, which spring bears against the shoulder $f$ at the top of the cylinder and the collar $g$ on the lower end of the plunger, so that when the plunger is drawn up in the cylinder the spring will be compressed, and by its elasticity force the plunger down again very quickly. The plunger is made to move tight in the cylinder by the packing $h$, held between the collar $g$ and the nut or follower $i$. It has a knob or button, $j$, on its upper end, by which it is raised.

$k$ is a valve-seat screwed into the lower end of the cylinder, and $l$ is the valve. A small hole, $m$, is made through the center of the valve, out of which the liquor which is drawn into the cylinder by the upward movement of the plunger is forced by its downward movement.

The operation of this combination is as follows: All kinds of beer and ales lose their flavor and taste by exposure to the air, and it is necessary to make them run freely from the cask to admit a certain quantity of air into its top. This give them a flat and insipid taste, especially when drawn off in small quantities at intervals, as in glasses. A glass being held under the nozzle of the faucet, the faucet is opened by turning the key until the glass is filled and then shut again. Before taking away the glass the plunger of the pump is drawn up, causing the valve to lift and the pump to fill itself from the liquor in the glass, which, when the plunger is forced down by the spring, will be injected back into the glass with great force through the small hole in the valve, causing the beer or ale to foam and sparkle and restoring completely its flavor, and even adding to it, so that the last glass drawn from the cask will have as good a flavor as the first.

$n$ is a small tube screwed into the side of the faucet and opening against the plug or key when the faucet is shut, but into a hole, $o$, drilled into the plug to its center and there meeting a vertical hole, $p$, drilled down through the handle of the plug, when the faucet is open. When the faucet is placed in a cask for use, a rubber tube, $q$, is made to connect the tube $n$ with a vent-tube driven into the top of the cask, so that when the faucet is open a communication will be formed from the air to the inside of the cask, causing the liquor to run freely, and when the faucet is shut the communication is also shut, thus making a perfectly reliable self-acting vent.

To cause the vent to open at the same time that the faucet does, a groove, $r$, of the proper length, is cut in the surface of the key, into which the hole $o$ opens, the groove coming opposite the pipe $n$ and opening the vent at the time the key is turned far enough to allow the passage of the liquor through the faucet.

We claim—

1. The combination of a force-pump or syringe with the faucet, when constructed and operating substantially as described.

2. The formation of the holes $o$ $p$ in the key of a faucet, with the tubes $n$ $q$, for the purpose of producing a self-acting vent, substantially as herein described.

JACOB JAHRAUS.
J. GEORGE BICKEL.

Witnesses:
GEO. W. WALLACE,
W. H. FORBUSH.